United States Patent
Pieters et al.

(10) Patent No.: US 8,552,113 B2
(45) Date of Patent: Oct. 8, 2013

(54) RUBBER MATERIAL OF A WIPER BLADE FOR WINDSHIELD WIPERS AND PROCESS FOR PRODUCTION THEREOF

(75) Inventors: Eric Pieters, AK Simpelveld (NL); Reiner Lay, Aachen (DE); Hilde Parton, Oud-Heverlee (BE)

(73) Assignee: Robert Bosch GmbH, Stuttgart (DE)

( * ) Notice: Subject to any disclaimer, the term of this patent is extended or adjusted under 35 U.S.C. 154(b) by 77 days.

(21) Appl. No.: 12/677,358

(22) PCT Filed: Sep. 29, 2008

(86) PCT No.: PCT/EP2008/062993
§ 371 (c)(1),
(2), (4) Date: Mar. 10, 2010

(87) PCT Pub. No.: WO2009/047153
PCT Pub. Date: Apr. 16, 2009

(65) Prior Publication Data
US 2010/0205764 A1    Aug. 19, 2010

(30) Foreign Application Priority Data
Oct. 1, 2007    (DE) .................... 10 2007 047 079

(51) Int. Cl.
C08L 7/00    (2006.01)
C08L 15/00   (2006.01)
C08L 21/00   (2006.01)
C08L 15/02   (2006.01)
C08L 23/00   (2006.01)
C08L 9/00    (2006.01)

(52) U.S. Cl.
USPC .............. 525/74; 525/86; 525/197; 525/210; 525/213; 525/233; 15/250.001

(58) Field of Classification Search
USPC ............ 525/215, 74, 86, 197, 210, 213, 232, 525/233; 15/250.001
See application file for complete search history.

(56) References Cited

U.S. PATENT DOCUMENTS

| | | | |
|---|---|---|---|
| 1,090,236 A | | 3/1914 | Ross |
| 4,877,827 A | | 10/1989 | Van Der Groep |
| 5,118,546 A | | 6/1992 | Burlett et al. |
| 5,397,837 A | * | 3/1995 | Arjunan ...................... 525/72 |
| 5,447,976 A | | 9/1995 | Curtin et al. |
| 6,195,833 B1 | | 3/2001 | Geilenkirchen et al. |
| 2003/0138655 A1 | * | 7/2003 | Watanabe et al. ............ 428/523 |
| 2004/0071984 A1 | * | 4/2004 | Manjanath Telang ........ 428/434 |
| 2009/0025174 A1 | * | 1/2009 | Braun et al. ............... 15/250.48 |

FOREIGN PATENT DOCUMENTS

| | | |
|---|---|---|
| DE | 19944274 A1 | 3/2001 |
| JP | 61035946 | 2/1986 |
| JP | 63304039 | 12/1988 |
| JP | 1035419 | 2/1989 |
| JP | H08501338 | 2/1996 |
| JP | 8319375 | 12/1996 |
| JP | 8319375 A | 12/1996 |
| JP | 2005088767 | 4/2005 |
| WO | 01/90236 A1 | 11/2001 |
| WO | WO 2006082149 * | 8/2006 |

OTHER PUBLICATIONS

PCT/EP20081062993 International Search Report.

* cited by examiner

*Primary Examiner* — Jeffrey Mullis
(74) *Attorney, Agent, or Firm* — Michael Best & Friedrich LLP

(57) ABSTRACT

A rubber material of a wiper blade for windshield wipers is described, which comprises a first rubber component of a first polarity and a second rubber component of a second greater polarity. To equalize the first and second polarities, the first rubber component is at least partially replaced by a chemically functionalized derivative.

7 Claims, 1 Drawing Sheet

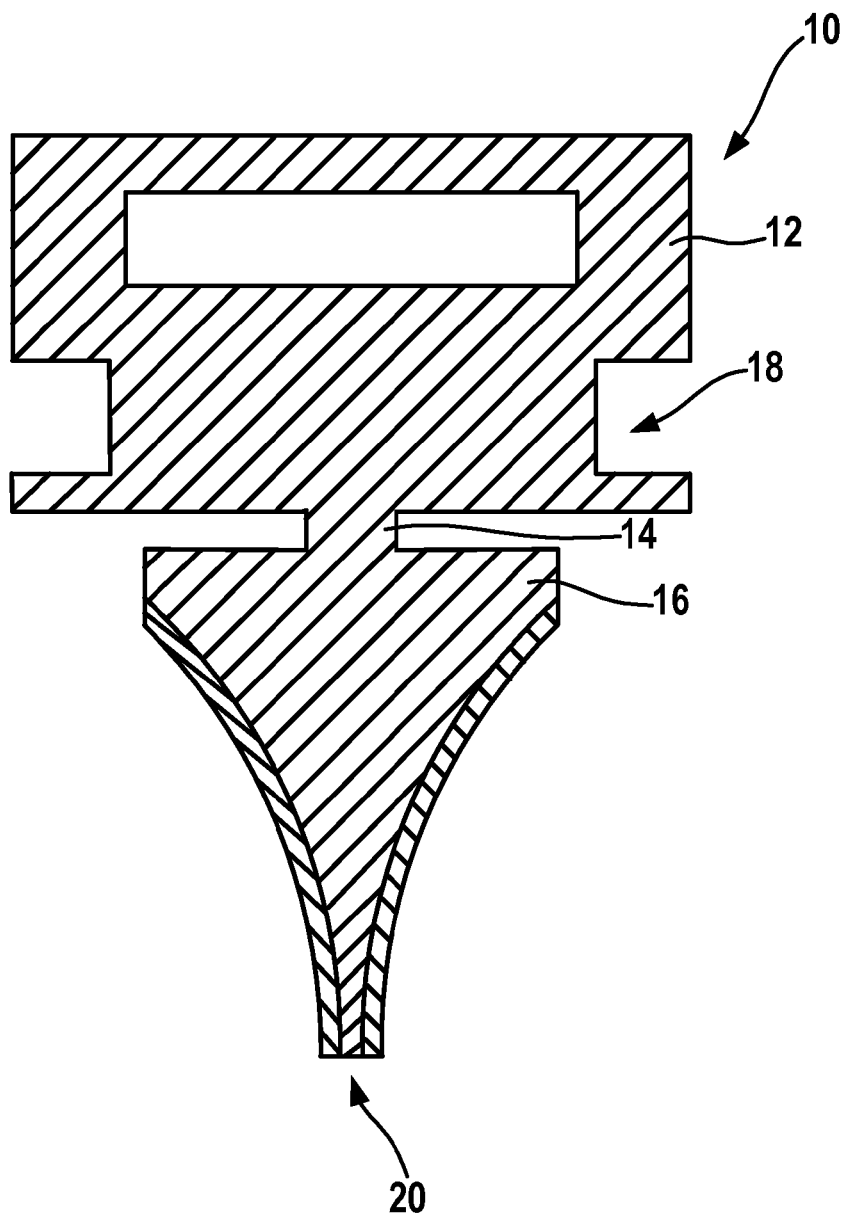

RUBBER MATERIAL OF A WIPER BLADE FOR WINDSHIELD WIPERS AND PROCESS FOR PRODUCTION THEREOF

BACKGROUND OF THE INVENTION

The invention relates to a rubber material of a wiper blade for windshield wipers, to a wiper blade comprising this material, and also to a process for production of this material.

Wiper-rubber materials for windshield wipers are subjected to a wide variety of physical and mechanical requirements. By way of example, they not only have to provide a satisfactory wiping result on, for example, a glass surface that requires cleaning, but also have to be abrasion-resistant and UV- or ozone-resistant.

By way of example, JP 358 758 7 B2 discloses wiper blades designed using a mixture of natural rubber and chloroprene together with fillers and processing aids. However, natural rubber and chloroprene have different polarities, natural rubber being relatively nonpolar, whereas chloroprene is polar.

This polarity difference between the two rubber components not only hinders the mixing of the two rubber materials for purposes of production of the wiper-rubber material but can also lead to migration, into the more polar chloroprene phase, of the processing aids such as vulcanization chemicals, e.g. accelerators or retarders, or of plasticizers and process auxiliaries. By way of example, the increased concentration of these substances in the chloroprene phase poses the risk of premature hardening in the crude rubber mixture, producing microscopic prevulcanizates which can markedly impair the wiping quality of a resultant rubber material. Another possible result of inhomogeneous distribution of the curing agent in a crude rubber mixture is local incomplete curing or local excessive hardening of the rubber system, and this can have a disadvantageous effect on the ageing properties of a resultant wiper rubber.

SUMMARY OF THE INVENTION

The present invention is based on the object of providing a wiper-rubber material which can be produced from a mixture of at least two rubber components while avoiding the disadvantages resulting from the prior art.

The rubber material of the invention encompasses a first and a second rubber component, where the first and second rubber components differ in their polarity. The invention at least partially replaces the rubber component of lower polarity with a chemically functionalized derivative. The polarities of the two rubber components are therefore brought closer to one another. This leads to good miscibility of the rubber components of the present rubber material and inhibits migration of fillers or processing aids during the mixing of the rubber material in the crude state. A resultant wiper blade thus exhibits very good wiping performance and is easy to produce.

If, by way of example, the first rubber component, with low polarity, is a polymer of a butadiene derivative, e.g. natural rubber (NR), butadiene rubber (BR), styrene-butadiene rubber (SBR), isobutyl-isoprene rubber (IIR), or isoprene rubber (IR), this is advantageously at least partially substituted by its functionalized derivative. It is therefore possible, for example, to replace NR at least partially with an epoxidized natural rubber (ENR). Another possibility is that IR, as first rubber component, of low polarity, is replaced at least partially with an epoxidized IR.

If the first rubber component, of low polarity, has been formed from BR, SBR, or IIR, each of these can be replaced with a halogenated or alkoxylated derivative or with a derivative provided with tertiary amine functions. It is thus possible to bring the polarity of this butadiene-derivative-based rubber component closer to the polarity of other, polar, rubber components, such as chloroprene or polyvinyl chloride. Replacement of BR, as first rubber component, of low polarity, with a copolymer of butadiene with acrylonitrile also leads to an increase in the polarity of the first rubber component.

It is also advantageous that ethylene-propylene-diene terpolymer (EPDM) or ethylene-propylene copolymer (EPM), as first rubber component, with low polarity, is replaced with an alkoxylated derivative or with a derivative provided with tertiary amine functions or, respectively, a derivative provided with nitrile groups. This is particularly advantageous when the second rubber component used, with high polarity, comprises a hydrogenated butadiene rubber (HNBR), an ethylene-vinyl acetate (EVM), a chlorosulfonated polyethylene (CSM) or a chlorinated polyethylene (CM). Here again, the result is that the polarities of the two rubber components are brought closer together, with the attendant advantages described above.

In one particularly advantageous embodiment of the present invention, the first rubber component, of low polarity, has been replaced with a derivative which in turn has been only partially chemically functionalized. The reason for this is that rubber derivatives having a large number of functional groups within the molecule can lead to excessive hardening of the entire system and therefore to unsatisfactory wiping quality of the resultant wiper rubber.

BRIEF DESCRIPTION OF THE DRAWINGS

The FIGURE illustrates an inventive example, which is described in more detail below. The single FIGURE shows a diagrammatic cross section of a wiper-rubber profile of a first embodiment of the present invention.

DETAILED DESCRIPTION

FIG. 1 shows a wiper-rubber profile 10 for wiper blades of a windshield wiper. This profile has been designed in essence in the form of a strip and encompasses a broadened stock 12, connected by way of a tiltable web 14 to a wedge-shaped section 16. The stock 12 has recesses 18 to accept an external spring bar (not shown). The wedge-shaped section 16 narrows to give a wiper lip 20 at its end facing away from the stock 12 and facing toward the glass area to be cleaned. The stock 12, wedge-shaped section 16 and tiltable web 14, being constituents of the wiper-rubber profile 10, can have been designed in a single piece made of one and the same rubber material. However, it is also possible that the stock 12 and the wedge-shaped section 16 are designed from different rubber materials, since the mechanical requirements profile for these two profile components is markedly different.

In order to achieve good wiping quality in the resultant wiper-rubber profile 10, this has preferably been designed from a mixture of at least two rubber components. By way of example, natural rubber is selected as first rubber component, and chloroprene (CR), polyvinyl chloride (PVC), or an NBR/PVC blend is selected as second rubber component. In order to reduce the difference in polarity between natural rubber and chloroprene or PVC or NBR/PVC, natural rubber is at least partially replaced with an epoxidized natural rubber ENR, the degree of epoxidation of the ENR used being, for example, from 15 to 50%, preferably from 15 to 25%.

In the same way, an isoprene rubber, as first rubber component, of low polarity, can be at least partially replaced with its epoxidized derivative in a rubber mixture with chloroprene or PVC.

If EPDM, EPM, BR or IIR is used as first rubber component, these can be replaced at least partially with a functionalized derivative, in order to bring their polarity closer to the polarity of a second, markedly more polar rubber component, such as HNBR, EVM, CM, CSM, CR or PVC. Functionalized derivatives are in particular the at least partially halogenated derivatives, the at least partially alkoxylated or aryloxylated derivatives, or else derivatives at least partially substituted with tertiary amine or nitrile groups.

In some embodiments, the rubber material is characterized in that BR has been replaced at least partially with a copolymer of butadiene with acrylonitrile and/or with polynorbornene (PNR).

Inventive examples of rubber mixtures are given below. The data in percent by weight are the proportion of the corresponding elastomer, based on the total content of elastomers in the rubber mixture:

|  | Elastomer 1 (nonpolar) | Functionalized polar derivative of elastomer 1 | Elastomer 2 (polar) |
| --- | --- | --- | --- |
| Ex. 1 | NR 30% by weight | ENR 30% by weight | CR 40% by weight |
| Ex. 2 | NR 40% by weight | ENR 20% by weight | CR 40% by weight |
| Ex. 3 | NR 30% by weight | ENR 20% by weight | CR 50% by weight |
| Ex. 4 | NR 40% by weight | ENR 20% by weight | NBR/PVC 40% by weight |
| Ex. 5 | EPDM 60% by weight | EPDM modified with maleic anhydride 10% by weight | EVM 30% by weight |
| Ex. 6 | EPDM 40% by weight | EPDM modified with maleic anhydride 10% by weight | EVM 50% by weight |
| Ex. 7 | EPDM 45% by weight | EPDM modified with maleic anhydride 15% by weight | HNBR 40% by weight |
| Ex. 8 | EPDM 30% by weight | EPDM modified with maleic anhydride 15% by weight | EVM 30% by weight + HNBR 20% by weight |

The preferred method of production of the rubber material in the form of the wiper-rubber profile 10 begins by mixing of a first rubber component with a second rubber component, where the first rubber component, of lower polarity, has been at least partially replaced with a functionalized, polar derivative, in such a way that the polarity of the first rubber component becomes closer to that of the second rubber component. Processing aids and fillers are also added to the rubber mixture, and shaping is then carried out by injection molding or extrusion. Finally, the resultant wiper-rubber profile 10 is subjected to a curing or crosslinking process and also, if appropriate, to surface treatment.

What is claimed is:

1. A windshield wiper blade comprising a first rubber component of a first polarity, a second rubber component of a second, greater polarity, and a chemically functionalized derivative of the first rubber component with a polarity greater than the first rubber component,
wherein the first rubber component is natural rubber (NR) and the chemically functionalized derivative of the first rubber component is epoxidized natural rubber (ENR); the first rubber component is isoprene rubber (IR) and the chemically functionalized derivative of the first rubber component is epoxidized IR; or the first rubber component is butadiene rubber (BR), styrene-butadiene rubber (SBR) or isobutyl-isoprene rubber (IIR) and the chemically functionalized derivative of the first rubber component is a halogenated or alkoxylated derivative of BR, SBR or IIR or a derivative of BR, SBR or IIR provided with tertiary amine functionality.

2. The windshield wiper blade as claimed in claim 1, characterized in that the second rubber component is chloroprene (CR) or polyvinyl chloride (PVC).

3. The windshield wiper blade as claimed in claim 1, characterized in that the chemically functionalized derivative of the first rubber component is partially chemically functionalized.

4. The windshield wiper blade of claim 1 further comprising a stock connected by way of a tiltable web to a wedge-shaped section, characterized in that the stock, the tiltable web, and/or the wedge-shaped section comprise the first rubber component, the second rubber component, and the chemically functionalized derivative of the first rubber component.

5. A process for the production of a windshield wiper blade, comprising:
mixing a first rubber component of a first polarity and a chemically functionalized derivative of the first rubber component to provide a first rubber mixture with a third polarity;
mixing the first rubber mixture and a second rubber component of a second polarity greater than the first polarity to provide a second rubber mixture; and
forming the second rubber mixture into a windshield wiper-rubber profile,
wherein the third polarity is closer to the second polarity than the first polarity is to the second polarity.

6. A windshield wiper blade comprising a first rubber component of a first polarity, a second rubber component of a second, greater polarity, and a chemically functionalized derivative of the first rubber component with a polarity greater than the first rubber component,
wherein the chemically functionalized derivative of the first rubber component is an epoxidized derivative, a halogenated derivative, an alkoxylated derivative, an aryloxylated derivative, a derivative provided with tertiary amine function, or a derivative provided with nitrile groups.

7. A windshield wiper blade comprising butadiene rubber (BR), a second rubber component of a polarity greater tha BR, and
a third component selected from the group consisting of 1) a copolymer of butadiene with acrylonitrile, 2) a polynorbornene rubber (PNR), and 3) a mixture thereof.

* * * * *

UNITED STATES PATENT AND TRADEMARK OFFICE
CERTIFICATE OF CORRECTION

PATENT NO. : 8,552,113 B2  Page 1 of 1
APPLICATION NO. : 12/677358
DATED : October 8, 2013
INVENTOR(S) : Pieters et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 177 days.

Signed and Sealed this
Fifteenth Day of September, 2015

Michelle K. Lee
*Director of the United States Patent and Trademark Office*